United States Patent
Kriessmann et al.

(10) Patent No.: US 6,515,042 B2
(45) Date of Patent: *Feb. 4, 2003

(54) AQUEOUS SELF-CROSSLINKING COPOLYMER DISPERSIONS, A PROCESS FOR PREPARING THEM AND THEIR USE IN BINDERS FOR COATING MATERIALS

(75) Inventors: Ingo Kriessmann; Rami-Raimund Awad; Hannelore Gsöll, all of Graz; Bernhard Hirschmann, Gleisdorf; Karl Rossmann, Wundschuh, all of (AT)

(73) Assignee: Solutia Austria GmbH, Werndorf (AT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 65 days.

(21) Appl. No.: 09/419,214

(22) Filed: Oct. 15, 1999

(65) Prior Publication Data

US 2002/0147262 A1 Oct. 10, 2002

(30) Foreign Application Priority Data

Oct. 19, 1998 (AT) ................................................ 1739/98

(51) Int. Cl.$^7$ ..................... C09D 151/00; C08F 265/06; C08F 257/02
(52) U.S. Cl. ...................... 523/201; 524/458; 524/512; 524/522; 524/523; 524/542; 524/592; 524/598; 525/376; 525/902
(58) Field of Search .......................... 523/201; 524/458, 524/512, 522, 523, 542, 592, 598; 525/376, 902

(56) References Cited

U.S. PATENT DOCUMENTS 4,210,565 A * 7/1980 Emmons ............... 260/29.6 TA
4,959,428 A * 9/1990 Abe et al. .................... 526/201
5,208,282 A * 5/1993 Rehmer et al. ............. 524/190
5,472,996 A * 12/1995 Hayashi et al. ............. 523/201
5,939,482 A   8/1999 Kriessmann et al.

FOREIGN PATENT DOCUMENTS

| AT | 402 504 B | 6/1997 | |
|---|---|---|---|
| EP | 0 555 774 A1 | 8/1993 | |
| EP | 0 649 865 A1 | 4/1995 | |
| EP | 0 795 568 A2 | 9/1997 | |
| JP | 57003850 | * 1/1982 | ................ 524/460 |
| WO | WO 96/16998 | 6/1996 | |

* cited by examiner

*Primary Examiner*—David W. Wu
*Assistant Examiner*—Kelechi Egwim
(74) *Attorney, Agent, or Firm*—Frommer Lawrence & Haug LLP

(57) ABSTRACT

Aqueous self-crosslinking copolymer dispersions ABC obtainable by free-radically initiated copolymerization in the first stage of a monomer mixture A comprising olefinically unsaturated monomers A1 having carbonyl groups, unsaturated carboxylic acids or monoesters of unsaturated dicarboxylic acids A2, monomers A3 selected from vinylaromatic compounds, n-butyl methacrylate and also alkyl esters of unsaturated carboxylic acids or dialkyl esters of unsaturated dicarboxylic acids, esters A4 selected from alkyl esters of unsaturated carboxylic acids of dialkyl esters of unsaturated dicarboxylic acids, and other free-radically polymerizable monomers A5, and subsequent addition of a second monomer mixture B and further polymerization in the second stage, the mixture B comprising olefinically unsaturated monomers B1 corresponding to A1, esters B2 corresponding to A4, and monomers B3 corresponding to A5, and subsequently adding compounds C having hydrazine or hydrazide groups.

19 Claims, No Drawings

AQUEOUS SELF-CROSSLINKING COPOLYMER DISPERSIONS, A PROCESS FOR PREPARING THEM AND THEIR USE IN BINDERS FOR COATING MATERIALS

RELATED APPLICATIONS

This application claims priority to Austrian application No. A1739/98, filed Oct. 19, 1998, herein incorporated by reference.

BACKGROUND OF THE INVENTION

1. Field of the Invention

The invention relates to aqueous self-crosslinking copolymer dispersions having a core-shell structure, at least some of the monomers forming the copolymer in the core having carbonyl groups and carboxyl groups as well as free-radically polymerizable olefinically unsaturated groups, and comprising dicarboxylic dihydrazides or bishydrazine compounds. The invention additionally relates to a two-stage process for preparing these aqueous self-crosslinking copolymer dispersions and to their use as binders for storage-stable one-component coating materials which crosslink at room temperature or at elevated temperature.

2. Description of the Related Art

EP-A 0 649 865 discloses self-crosslinking carbonyl-containing polyurethane-vinyl hybrid dispersions which crosslink by way of hydrazine compounds but do not have a core-shell structure.

EP-A 0 555 774 discloses copolymer dispersions formed by copolymerizing monomers having carbonyl groups and carboxyl groups. These dispersions also do not have a core-shell structure, as they are prepared in a single-stage polymerization with no change in the composition of the monomer mixture. The binders prepared with these dispersions are crosslinked by reaction with the polyamines employed as neutralizing agents. With these products, first a high proportion of carbonyl groups is required to achieve sufficient crosslinking density of the coating films and second this high proportion of corresponding monomers results, during the copolymerization, in the formation of gel specks and coagulum whose removal can only be accomplished at great expense in terms of time and apparatus. In addition, the polyamine employed as crosslinking component leads to severe yellowing of the coating film and so to problems in numerous applications.

AT-B 402 504 describes self-crosslinking aqueous polymer dispersions which are prepared in a two-stage process. In this process, the composition of the monomer mixture for the second stage of the polymerization differs from that of the first stage. These copolymer dispersions have small fractions of carbonyl groups and permit high crosslinking densities without forming the coagulum or gel specks that are difficult to remove. However, the polyamines employed as crosslinking component likewise occasion severe yellowing of the resulting coating films.

European Patent Application EP-A 0 795 568 describes aqueous polymer dispersions having a core-shell structure in the core of which at least 50% of the monomers which are employed are those whose homopolymers have a glass temperature of below 0° C. while the proportion of such monomers employed in the shell is less than 45%. Difunctional acid hydrazides can also be added to the dispersion. Where such hydrazides are added in the examples, the monomer mixture for the shell of the polymer particles also includes a monomer that contains ketone groups. In this case, the monomer composition is selected in accordance with the desired minimum film-forming temperatures.

In AT-B 403 478, the dispersions known from AT-B 402 504 are combined with polyfunctional isocyanates of low molar mass to form two-component binders. Although it is possible in this way to provide coating materials which have a reduced tendency to yellow and an improved resistance to water, chemicals and light exposure, there are disadvantages associated with these coating materials. These include the complex preparation of the coating material, the limited pot life, prolonged drying time, and relatively low film hardness.

OBJECT OF THE INVENTION

It has surprisingly now been found that aqueous copolymer dispersions prepared in accordance with AT-B 402 504 by a two-stage process in which monomers having in each case carbonyl and carboxyl groups are employed only in the first stage (which leads to the core of the particles) can be crosslinked, following neutralization of the carboxyl groups by adding small amounts of ammonia, amines or aqueous alkalis, with polyfunctional hydrazides and lead to binders having a sufficient pot life which can be processed to give coating materials having high film hardness, good resistance to mechanical and chemical exposure, rapid drying, and little or no tendency to yellow.

SUMMARY OF THE INVENTION

The invention accordingly provides aqueous self-crosslinking copolymer dispersions ABC obtainable by free-radically initiated copolymerization in the first stage of a monomer mixture A comprising mass fractions in the mixture of A1 from about 2 to about 55%, preferably from about 4 to about 45% and, with particular preference, from about 6 to about 40% of olefinically unsaturated monomers having in each case at least one carbonyl group per molecule, A2 from about 0.5 to about 20%, preferably from about 1 to about 15% and, with particular preference, from about 3 to about 12% of α,β-olefinically unsaturated carboxylic acids or monoesters of α,β-olefinically unsaturated dicarboxylic acids with linear, branched or cyclic alcohols having 1 to 15 carbon atoms, A3 from about 20 to about 70%, preferably from about 22 to about 60% and, with particular preference, from about 24 to about 50% of olefinically unsaturated monomers selected from vinylaromatic compounds, n-butyl methacrylate and also alkyl esters of α,β-olefinically unsaturated carboxylic acids or dialkyl esters of α,β-olefinically unsaturated dicarboxylic acids, the alkyl groups being selected from linear and branched alkyl groups having up to 3 carbon atoms in the alkyl radical and cyclic and polycyclic alkyl groups having 5 to 15 carbon atoms in the alkyl group, A4 from about 10 to about 60%, preferably from about 15 to about 50% and, with particular preference, from about 20 to about 45% of esters selected from alkyl esters of α,β-olefinically unsaturated carboxylic acids or dialkyl esters of α,β-olefinically unsaturated dicarboxylic acids, the alkyl groups being selected from linear and branched alkyl groups having more than 3 carbon atoms in the alkyl radical, with the exception of n-butyl methacrylate, and A5 from 0 to about 25%, preferably from about 2 to about 20% and, with particular preference, from about 5 to about 15% of other free-radically polymerizable monomers selected from vinyl esters of aliphatic saturated carboxylic acids having 2 to 18 carbon atoms, hydroxyalkyl esters, nitriles and amides of α,β-unsaturated carboxylic acids, the sum of the mass fractions of components A1 to A5 necessarily being 100%, and by subsequent addition of a second monomer mixture B and further free-radically initiated polymerization of this monomer mixture in the second stage, the mixture B comprising mass fractions of B1 from about 30 to about 90%, preferably from about 40 to about 80% and, with particular preference, from about 50 to about 75% of olefinically unsaturated monomers selected from vinylaromatic compounds, n-butyl methacrylate and also alkyl esters of α,β-olefinically unsaturated carboxylic acids or dialkyl esters of α,β-olefinically unsaturated dicarboxylic acids, the alkyl groups being selected from linear and branched alkyl groups having up to 3 carbon atoms in the alkyl radical and cyclic and polycyclic alkyl groups having 5 to 15 carbon atoms in the alkyl group, B2 from about 10 to about 60%, preferably from about 20 to about 50% and, with particular preference, from about 25 to about 40% of esters selected from alkyl esters of α,β-olefinically unsaturated carboxylic acids or dialkyl esters of α,β-olefinically unsaturated dicarboxylic acids, the alkyl groups being selected from linear and branched alkyl groups having more than 3 carbon atoms in the alkyl radical, with the exception of n-butyl methacrylate, and B3 from 0 to about 40%, preferably from about 5 to about 30% and, with particular preference, from about 10 to about 25% of other free-radically polymerizable monomers selected from vinyl esters of aliphatic saturated carboxylic acids having 2 to 18 carbon atoms, hydroxyalkyl esters, nitriles and amides of α,β-unsaturated carboxylic acids, the sum of the mass fractions of components B1 to B3 necessarily being 100%, and the ratio of the mass of the monomer mixture A to the mass of the monomer mixture B is from about 50:50 to about 95:5, preferably from about 60:40 to about 90:10.

The copolymers AB obtainable in this way preferably contain, based on the mass of the solids of the dispersion, from about 0.2 to about 1.7 mol/kg of carbonyl groups and from about 0.15 to about 1.6 mol/kg of carboxyl groups. The amount of substance of the carboxyl groups here is always lower than the amount of substance of the carbonyl groups; preferably, the ratio of the amount of substance of the carboxyl groups n(—COOH) to the amount of substance of the carbonyl groups n(>CO) is from about 0.5 to about 0.95 mol/mol, with particular preference from about 0.75 to about 0.9 mol/mol.

The resulting dispersions of the copolymers AB are neutralized following the polymerization by adding ammonia, amines or aqueous alkalis, the amount in which the neutralizing agents are added being such that it is sufficient to neutralize from 0 to about 120% of the carboxyl groups present.

To the dispersion neutralized in this way there are subsequently added compounds C having at least two hydrazine or hydrazide groups per molecule, in an amount such that the ratio r of the sum of the amount of substance of hydrazine groups n(—NH—NH$_2$) and the amount of substance of hydrazide groups n(—CO—NH—NH$_2$) to the amount of substance of the carbonyl groups n(>CO) is from about 0.5 to about 1.1 mol/mol, preferably between about 0.8 and about 1.0 mol/mol.

The invention additionally provides a process for preparing the copolymer dispersions of the invention, in which water with or without emulsifiers is introduced as initial charge and heated to the desired reaction temperature, a mixture comprising water, emulsifiers if desired, the monomer mixture A, and a free-radical polymerization initiator is metered in to this initial charge, the polymerization is continued until at least 95% of the monomers have reacted, then a second mixture comprising water, emulsifiers if desired, and also the monomer mixture B and a further free radical forming polymerization initiator is metered in and the polymerization is subsequently continued until the residual monomer content has fallen below 1%. The resulting dispersion is cooled and admixed, with stirring, with the neutralizing agent, preferably in the form of an aqueous solution. Subsequently, the hydrazine compound or hydrazide compound C is added with stirring to the neutralized dispersion of the copolymer AB to form the self-crosslinking dispersion ABC.

Finally, the invention also provides for the use of these dispersions as binders for storage-stable one-component coating materials which crosslink at room temperature or at elevated temperature.

DETAILED DESCRIPTION OF THE INVENTION

The amines or alkalis used if desired for neutralization improve the stability of the aqueous copolymer dispersions.

Olefinically unsaturated monomers containing carbonyl groups are employed as monomer component A1. Preference is given to the use of linear, branched and cyclic aliphatic compounds having 4 to 20 carbon atoms and each containing at least one carbonyl group and one ethylenic double bond. To a minor extent (up to 10% of the mass of the monomers A1) it is also possible to employ compounds having two or more polymerizable double bonds, which leads to crosslinking of the copolymer. Particular preference is given to the use of α,β-olefinically unsaturated monomers such as N-diacetone(meth)acrylamide and (meth)acrylic acid acetoacetoxyalkyl esters whose alkylene group is selected from 1,2-ethylene, 1,2- and 1,3-propylene, 1,4-butylene and 1,6-hexylene and also 1,5-(3-oxa)pentylene and 1,8-(3,6-dioxa) octylene groups, especially the ethyl esters.

The monomers A2 are preferably α,β-unsaturated carboxylic acids having 3 to 4 carbon atoms, such as acrylic acid, methacrylic acid, crotonic and isocrotonic acid and also vinylacetic acid. Monoesters of α,β-unsaturated carboxylic acids with linear, branched or cyclic alcohols having 1 to 15 carbon atoms can also be employed, the dicarboxylic acids preferably having 4 to 6 carbon atoms. Preference is given to monomethyl and monoethyl esters of maleic acid, fumaric acid, and also citraconic, mesaconic, itaconic and glutaconic acid.

Of the monomers A3, preference is given to the esters of methanol, ethanol, n-and isopropanol with acrylic and methacrylic acid and to the diesters of said alcohols with the dicarboxylic acids specified under A2, and also to n-butyl methacrylate and, of the vinylaromatic compounds, especially styrene, p-methylstyrene and the isomer mixture known as "vinyltoluene". Particular preference is given to methyl and ethyl (meth)acrylate, n-butyl methacrylate, styrene, and dimethyl maleate.

As monomers A4 it is preferred to employ the esters of n-, sec-and tert-butanol, the isomeric pentanols and the higher alcohols such as n-hexanol and 2-ethylhexyl alcohol with α,β-unsaturated carboxylic acids selected from acrylic and methacrylic acid, vinylacetic acid, maleic acid and fumaric acid; in the case of the dicarboxylic acids referred to, the diesters are used, and n-butyl methacrylate is excluded.

As examples of the hydroxyalkyl esters of olefinically unsaturated carboxylic acids as monomer component A5 mention may be made of hydroxyethyl and 2-hydroxypropyl (meth)acrylate, (meth)acrylonitrile, (meth)acrylamide and, for the vinyl esters, of vinyl acetate.

In the second stage a polymer having a different chemical structure is produced by adding the monomer mixture B alone or together with new initiators.

The monomers B1 correspond to those specified under A3, the monomers B2 to those specified under A4, and the monomers B3, finally, to those specified under A5. The monomer mixture B is therefore free from compounds having functional groups selected from carbonyl and carboxyl groups.

The compounds C with hydrazine or hydrazide functionality comprise two or more hydrazine or hydrazide groups and preferably have an average molar mass ($M_n$) of less than about 1000 g/mol. Examples of such compounds are bishydrazides of dicarboxylic acids having 2 to 12 carbon atoms such as the bishydrazides of oxalic acid, malonic acid, succinic acid, glutaric acid, adipic acid, pinalic acid, suberic acid, azelic acid, sebacic acid or the isomeric phthalic acids; carbonic bishydrazide, alkylene- or cycloalkylene-bissemicarbazides, N,N'-diaminoguanidine, alkylene-bishydrazines such as N,N'-diaminopiperazine, arylenebishydrazines such as phenylene- or naphthylenebishydrazine, and alkylenebissemicarbazides. Compounds C of higher functionality are, for example, the hydrazides of nitrilotriacetic acid or of ethylenediaminetetracetic acid.

The copolymer dispersions of the invention have excellent stability on storage and produce films having good resistance properties. They can be employed as binders for industrial coatings and primers. In addition, they can be used to formulate transparent coating materials which can be used in turn to coat wood, plastic, leather or paper.

The crosslinking of the copolymer dispersions takes place by reaction of the hydrazine or hydrazide groups of the compounds C with the carbonyl groups of the copolymer dispersions AB at temperatures as low as room temperature following the evaporation of a substantial proportion of water.

The formulation of water-dilutable coating materials using the binders prepared in accordance with the invention, and the application of such coating materials, are known to the skilled worker.

The examples which follow illustrate the invention without restricting it in its scope. In the examples below, as in the text which precedes them, all figures with the unit "%" are mass fractions unless specified otherwise. "Parts" are always parts by mass. Concentration figures in "%" are mass fractions of the dissolved substance in the solution (in g/100 g)).

EXAMPLES

Example 1

In a reactor suitable for emulsion copolymerization with reflux condenser, thermometer and two feed vessels a mixture of 360 parts of demineralized water, 24 parts of ®Triton X200 (sodium alkylaryl polyether sulfonate, manufacturer: Rohm & Haas, USA) and 5.4 parts of (®Triton X165 (octylphenol ethoxylate, manufacturer: Rohm & Haas, USA) was homogenized with stirring.

The feed vessel A was charged with a homogeneous emulsion consisting of 1150 parts of demineralized water, 24 parts of Triton X200, 10 parts of Triton X165, 3.2 parts of ammonium peroxodisulfate, 165 parts of n-butyl methacrylate, 280 parts of n-butyl acrylate, 275 parts of styrene, 140 parts of acetoacetoxyethyl methacrylate and 40 parts of methacrylic acid. 5% of this initial emulsion was run into the reactor. The contents of the reactor were heated to 85° C. with stirring and held at this temperature for 10 minutes. Then the remaining contents of the feed vessel A were metered into the reactor at a uniform rate over 120 minutes at 85° C.

Subsequently, a homogeneous emulsion of 100 parts of demineralized water, 3.1 parts of Triton X200, 2.4 parts of Triton X165, 30 parts of n-butyl acrylate, 70 parts of styrene and 0.8 part of ammonium peroxodisulfate were metered in over 30 minutes at 85° C. from the feed vessel B. Following the end of the addition, the contents of the reactor were heated to 88° C. and held at this temperature for 120 minutes. Finally, the reaction mixture was cooled to 25° C. and adjusted to a pH of 5.5 by adding 10% aqueous ammonia solution. Thereafter, 51.2 parts of adipic dihydrazide were added over the course of 30 minutes. This gave an opalescent dispersion having a mass fraction of solids of 38.8% and an average particle size of 105 nm. The pH was 5.5.

Examples 2 to 7

The procedure of Example 1 was repeated. The compositions of the initial charges to the reactor and of the feeds, plus altered polymerization parameters, can be taken from Table 1, in which the following abbreviations are used:

| ADH | Adipic dihydrazide | HBA | 4-Hydroxybutyl acrylate |
|---|---|---|---|
| ODH | Oxalic dihydrazide | HEMA | 2-Hydroxyethylmethacrylate |
| AAEMA | Acetoacetoxyethylmethacrylate | MA | Methacrylic acid |
| APS | Ammonium peroxodisulphate | pMST | p-Methylstyrene |
| AA | Acrylic acid | $NH_3$ | Ammonia |
| BA | Butyl acrylate | ST | Styrene |
| BMA | Butyl methacrylate | X 165 | ®Triton X 200 (Rohm & Haas, USA) |
| BV | ®Hostapal BV conc. (Clariant GmbH, DE) | X 200 | ®Triton X 200 (Rohm & Haas, USA) |
| DAA | Diacetoneacrylamide | X 305 | ®Triton X 305 (Rohm & Haas, USA) (alkylaryl polyether alcohol) |
| DBF | Dibutyl fumarate | | |
| DMEA | Dimethylethanolamine | | |
| DW | Demineralized water | | |
| EHA | 2-Ethylhexyl acrylate | | |

TABLE 1

| | | Example | | | | | | | |
|---|---|---|---|---|---|---|---|---|---|
| | | 1 | | 2 | | 3 | | 4 | |
| Initial charge | | 360 | DW | 420 | DW | 325 | DW | 325 | DW |
| | | 24 | X 200 | 25 | X 200 | 25 | X 200 | 10 | BV |
| | | 5.4 | X 165 | 7 | X 165 | 7 | X 165 | 7 | X 165 |
| Feed A | | 1150 | DW | 1210 | DW | 1100 | DW | 1000 | DW |
| | | 24 | X 200 | 25 | X 200 | 25 | X 200 | 10 | BV |
| | | 10 | X 165 | 5.6 | X 165 | 5.6 | X 165 | 5.6 | X 165 |
| | | 3.2 | APS | 5 | APS | 5 | APS | 5 | APS |
| | | 165 | BMA | 195 | MMA | 185 | EHA | 250 | ST |
| | | 280 | BA | 200 | BA | 420 | BMA | 285 | BA |
| | | 275 | ST | 320 | AAEMA | 100 | BA | 120 | DAA |
| | | 140 | AAEMA | 85 | AA | 70 | DAA | 45 | MA |
| | | 40 | MA | | | 25 | AA | | |
| Fraction of feed A in the initial charge (%) | | 5 | | 7.5 | | 7.5 | | 10 | |
| Feed time A (min) | | 120 | | 100 | | 100 | | 90 | |
| Feed B | | 100 | DW | 200 | DW | 200 | DW | 250 | DW |
| | | 3.1 | X 200 | 6 | X 200 | 6 | X 200 | 5 | BV |
| | | 2.4 | X 165 | 1.4 | X 165 | 1.4 | X 165 | 2 | X 165 |
| | | 0.8 | APS | 0.8 | APS | 0.8 | APS | 1 | APS |
| | | 30 | BA | 150 | BMA | 150 | ST | 100 | pMST |
| | | 70 | ST | 50 | BA | 50 | EHA | 150 | BA |
| | | | | | | | | 50 | BMA |
| Feed time B (min) | | 30 | | 45 | | 45 | | 60 | |
| Neutralizing agent | | 55 | NH$_3$ (10%) | 87 | DMEA (10%) | 24 | NH$_3$ (10%) | 47 | NH$_3$ (10%) |
| Crosslinker | | 51.2 | ADH | 110.6 | ADH | 24.4 | ODH | 58.7 | ADH |
| pH (as 10% strength solution in water) | | 5.5 | | 6.2 | | 6.4 | | 5.8 | |

| | | Example | | | | | |
|---|---|---|---|---|---|---|---|
| | | 5 | | 6 | | 7 | |
| Initial charge | | 280 | DW | 325 | DW | 325 | DW |
| | | 10 | BV | 25 | X 200 | 10 | BV |
| | | 7 | X 305 | 7 | X 165 | 7 | X 165 |
| Feed A | | 1000 | DW | 1100 | DW | 1000 | DW |
| | | 8 | BV | 25 | X 200 | 10 | BV |
| | | 5 | X 305 | 5.6 | X 165 | 5.6 | X 165 |
| | | 5 | APS | 5 | APS | 5 | APS |
| | | 150 | MMA | 135 | EHA | 200 | ST |
| | | 205 | DBF | 380 | BMA | 335 | BA |
| | | 180 | DAA | 50 | BA | 120 | AAEMA |
| | | 65 | MS | 100 | DAA | 50 | HEMA |
| | | | | 100 | HBA | 45 | MS |
| | | | | 35 | AA | | |
| Fraction of feed A in the initial charge (%) | | 10 | | 7.5 | | 10 | |
| Feed time A (min) | | 90 | | 100 | | 90 | |
| Feed B | | 300 | DW | 200 | DW | 250 | DW |
| | | 7 | BV | 6 | X 200 | 5 | BV |
| | | 3 | X 305 | 1.4 | X 165 | 2 | X165 |
| | | 1.2 | APS | 0.8 | APS | 1 | APS |
| | | 200 | ST | 150 | ST | 100 | pMST |
| | | 100 | BA | 50 | EHA | 100 | BA |
| | | 100 | BMA | | | 50 | BMA |
| Feed time B (min) | | 60 | | 45 | | 60 | |
| Neutralizing agent | | 69 | DMEA (10%) | 27 | NH$_3$ (10%) | 38 | NH$_3$ (10%) |
| Crosslinker | | 92.7 | ADH | 31.4 | ODH | 41.5 | ADH |
| pH (as 10% strength solution in water) | | 6.0 | | 6.5 | | 5.8 | |

TABLE 2

| | Example | | | | | | | |
|---|---|---|---|---|---|---|---|---|
| | 1 | 2 | 3 | 4 | 5 | 6 | 7 | V1 |
| Solids content in % | 33.7 | 37.5 | 38.3 | 40.0 | 39.1 | 38.5 | 38.5 | 38.8 |
| PH | 5.5 | 6.2 | 6.4 | 5.8 | 6.0 | 6.5 | 5.8 | 7.9 |
| Average particle size in nm | 105 | 100 | 115 | 100 | 95 | 105 | 100 | 90 |
| n(>CO)/m[1] in mol/kg | 0.65 | 1.5 | 0.41 | 0.71 | 1.07 | 0.59 | 0.56 | 0.65 |
| n(-COOH)/m[2] in mol/kg | 0.47 | 1.18 | 0.35 | 0.52 | 0.76 | 0.49 | 0.52 | 0.47 |
| n(-COOH)/n(>CO)[3] in mol/mol | 0.72 | 0.79 | 0.85 | 0.73 | 0.71 | 0.83 | 0.93 | 0.72 |
| r[4] in mol/mol | 0.90 | 0.85 | 1.00 | 0.95 | 1.00 | 0.90 | 0.85 | 0.95 |

[1] specific carbonyl group content in mol/kg
[2] specific carboxyl group content in mol/kg
[3] molar ratio n(-COOH)/n(>CO) in mol/mol
[4] molar ratio r = (n-(NH—NH$_2$) + n(-CO—NH—NH$_2$))/n(>CO) in mol/mol
V1 Example from AT-B 402 504

Performance Testing In Transparent Coating Materials

The transparent coating materials 1 to 5 and V1 were prepared by mixing an amount of the hydrazide-containing copolymer dispersion such that the mass of solids present therein was 100 g, 0.8 g of a commercially customary defoamer, 0.2 g of a commercially customary leveling agent, and deionized water sufficient to give an efflux time of 25 seconds at 23° C. in accordance with DIN 53 211. The results of the performance tests are summarized in Table 3:

with the solvent was placed on the coating film and covered with a glass beaker. The time taken for the film to soften was measured.

Pot life: The two-component coating material is stirred at hourly intervals. This operation is repeated until the onset of gelling.

Yellowing: 200 μm wet-film thickness on maple (veneered). The assessment is made during storage at room temperature for 4 weeks (1=no discernible discoloration 5=very severe discoloration).

TABLE 3

| Transparent coating material | 1 | 2 | 3 | 4 | 5 | V1 | V2 |
|---|---|---|---|---|---|---|---|
| Tack-free time in minutes | 15 | 15 | 15 | 15 | 15 | 15 | 50 |
| Sandability | 0 | 0 | 0 | 0 | 0 | 0 | MIN |
| Pendulum hardness in s | 72 | 75 | 82 | 73 | 68 | 80 | 50 |
| Acetone resistance in s | >60 | >60 | >60 | >60 | >60 | >60 | >60 |
| Ethanol resistance in h | 5 | 4 | 4 | 5 | 4 | 5 | >8 |
| Water resistance in h | >48 | >36 | >48 | >36 | >36 | >24 | >48 |
| Yellowing | 1 | 1–2 | 1 | 1 | 1–2 | 4 | 1–2 |
| Pot life (storage stability) | >3 mths | >3 mths | >3 mths | >3 mths | >3 mths | >3 mths | 20 hrs |

V1 Example 1 from AT-B 402 504, see above
V2 Clearcoat of AT-B 403 478

Tack-free time: Drying recorder, glass strips, application of a coating film with a wet-film thickness of 150 μm, at 20° C. (statement of time in minutes until a tack-free surface is obtained)

Sandability: Veneered wood, application of a coating film with a wet-film thickness of 150 μm; the parameter tested was the clogging of abrasive paper (320 grade) after 10 strokes following a drying time of 60 minutes at room temperature.

The clogging of the abrasive paper is a practical test for the user (parquet layer, furniture maker). It refers to the attachment of freshly applied coating films to the abrasive paper in the case of sanding prior to the application of a further coating film.

The optimum value is 0 (no clogging) although the value MIN (attachments to less than 10% of the area of the abrasive paper) is also accepted.

KÖNIG pendulum hardness (DIN 53157): Glass plates, application of a coating film with a wet-film thickness of 120 μm, drying time of 24 hours at 20° C.

Resistance to acetone, ethanol and water: Glass plates, application of a coating film with a wet-film thickness of 120 μm, drying time of 24 hours at 20° C.; a cotton pad soaked The above description of the invention is intended to be illustrative and not limiting. Various changes or modifications in the embodiments described may occur to those skilled in the art. These can be made without departing from the scope and spirit of the invention.

What is claimed:

1. An aqueous self-crosslinking copolymer dispersion, ABC, having a core-shell structure, obtained by
   first, conducting a free-radically initiated copolymerization of the monomer mixture A, which leads to the core of the particles and consists of mass fractions in the mixture of
   A1 from about 2 to about 55%, of olefinically unsaturated monomers having in each case at least one ketone carbonyl group per molecule,
   A2 from about 0.5 to about 20%, of α,β-olefinically unsaturated carboxylic acids or monoesters of α,β-olefinically unsaturated dicarboxylic acids with linear, branched or cyclic alcohols having 1 to 15 carbon atoms,
   A3 from about 20 to about 70%, of olefinically unsaturated monomers selected from vinylaromatic compounds, n-butyl methacrylate, alkyl esters of α,β-olefinically unsaturated carboxylic acids and dialkyl esters of α,β-olefinically unsaturated dicarboxylic acids, the alkyl groups being selected from linear and branched alkyl groups having up to 3 carbon atoms in the alkyl radical and cyclic and polycyclic alkyl groups having 5 to 15 carbon atoms in the alkyl group, A4 from about 10 to about 60% by weight, of esters selected from alkyl esters of α,β-olefinically unsaturated carboxylic acids and dialkyl esters of α,β-olefinically unsaturated dicarboxylic acids, the alkyl groups being selected from linear and branched alkyl groups having more than 3 carbon atoms in the alkyl radical, with the exception of n-butyl methacrylate, and A5 from 0 to about 25%, of other free-radically polymerizable monomers selected from vinyl esters of aliphatic saturated carboxylic acids having 2 to 18 carbon atoms, hydroxyalkyl esters, nitriles and amides of α,β-unsaturated carboxylic acids, where the sum of the mass fraction of compounds A1 to A5 is 100%, and subsequently adding to the product of said copolymerization a second monomer mixture B, which consists of mass fractions in the mixture of B1 from about 30 to 90%, of olefinically unsaturated monomers selected from vinylaromatic compounds, n-butyl methacrylate, alkyl esters of α,β-olefinically unsaturated carboxylic acids and dialkyl esters of α,β-olefinically unsaturated dicarboxylic acids, the alkyl groups being selected from linear and branched alkyl groups having up to 3 carbon atoms in the alkyl radical and cyclic and polycyclic alkyl groups having 5 to 15 carbon atoms in the alkyl group, B2 from about 10 to about 60%, of esters selected from alkyl esters of α,β-olefinically unsaturated carboxylic acids and dialkyl esters of α,β-olefinically unsaturated dicarboxylic acids, the alkyl groups being selected from linear and branched alkyl groups having more than 3 carbon atoms in the alkyl radical, with the exception of n-butyl methacrylate, and B3 from 0 to about 40%, of other free-radically polymerizable monomers selected from vinyl esters of aliphatic saturated carboxylic acids having 2 to 18 carbon atoms, hydroxyalkyl esters, nitriles and amides of α,β-unsaturated carboxylic acids, where the sum of the mass fractions of compounds B1 to B3 is 100% and the ratio of the mass of monomer mixture A to monomer mixture B is from about 50:50 to about 95:5, and initiating a second free-radically initiated polymerization of the monomer mixture and optionally neutralizing the dispersion after polymerization by adding ammonia, amines or aqueous alkali, wherein the ratio of the amount of substance of the carboxyl groups in copolymer AB to that of the ketone carbonyl groups in said copolymer is from about 0.5 to about 0.95 mol/mol, and adding compounds C, having at least two hydrazine or hydrazide groups per molecule in an amount such that the ratio r of the sum of the amount of substance of hydrazine groups n(—NH—NH$_2$) and the amount of substance of hydrazide groups n(—CO—NH—NH$_2$) to the amount of substance of the ketone carbonyl groups n(>CO) is from about 0.5 to about 1.1 mol/mol.

2. An aqueous self-crosslinking copolymer dispersion ABC as claimed in claim 1, wherein the ketone carbonyl group content is from about 0.2 to about 1.7 mol/kg and the carboxyl group content is from about 0.15 to about 1.6 mol/kg, based in each case on the mass of the solids of the dispersion.

3. An aqueous self-crosslinking copolymer dispersion ABC as claimed in claim 1, wherein up to 10% of the mass of the monomers of A1 have 2 or more polymerizable double bonds.

4. An aqueous self-crosslinking copolymer dispersion ABC as claimed in claim 1, wherein the monomers of A1 are selected from the group consisting of diacetone(meth)acrylamide and (meth)acrylic acid acetoacetoxyalkyl esters whose alkylene group is selected from groups selected from the group consisting of 1,2-ethylene, 1,2-propylene, 1,3-propylene, 1,4-butylene, 1,6-hexylene, 1,5-(3-oxa)pentylene and 1,8-(3,5-dioxa)octylene.

5. An aqueous self-crosslinking copolymer dispersion ABC as claimed in claim 1, wherein the monomers of A2 are selected from the group consisting of acrylic acid and methacrylic acid.

6. An aqueous self-crosslinking copolymer dispersion ABC as claimed in claim 1, wherein the monomers of A3 and B1 are independent of one another selected from the group consisting of methyl(meth)acrylate, ethyl(meth)acrylate and dimethylmaleate.

7. An aqueous self-crosslinking copolymer dispersion ABC as claimed in claim 1, wherein the monomers of A4 and of B2 independently of one another are selected from the acrylic esters of n-, sec- and isobutanol, n-hexanol and 2-ethylhexanol and methacrylic esters of sec-and isobutanol, n-hexanol and 2-ethylhexanol.

8. An aqueous self crosslinking copolymer dispersion ABC as claimed in claim 1, wherein the monomers of A5 and of B3 independently of one another are vinyl acetate.

9. An aqueous self-crosslinking copolymer dispersion ABC as claimed in claim 1, wherein the compounds C are selected from the group consisting of oxalic dihydrazide, adipic dihydrazide, and diaminopiperazine.

10. An aqueous self-crosslinking copolymer dispersion ABC as claimed in claim 1, wherein the monomer mixture A comprises mass fractions of from 2 to 55% of monomers A1,
from 0.5 to 20% of monomers A2,
from 20 to 70% of monomers A3,
from 10 to 60% of monomers A4,
from 0 to 25% of monomers A5, and the monomer mixture B comprises mass fractions of from 30 to 90% of monomers B1,
from 10 to 60% of monomers B2,
from 0 to 40% of monomers B3.

11. An aqueous self-crosslinking copolymer dispersion ABC as claimed in claim 1, wherein monomer mixture A comprises mass fractions of from about 4 to about 50% of monomers A1,
from about 1 to about 15% of monomers A2,
from about 22 to about 60% of monomers A3,
from about 15 to about 50% of monomers A4
from about 2 to about 20% of monomers A5, and the monomer mixture B comprises mass fractions of from about 40 to about 80% of monomers B1,
from about 20 to about 50% of monomers B2, and
from about 5 to about 30% of monomers B3.

12. An aqueous self-crosslinking copolymer dispersion ABC as claimed in claim 1, wherein monomer mixture A comprises mass fractions of from about 6 to about 44% of monomers A1,
from about 3 to about 12% of monomers A2,
from about 24 to about 50% of monomers A3, from about 20 to about 45% of monomers A4, from about 5 to about 15% of monomers A5, and the monomer mixture B comprises mass fractions of from about 50 to about 75% of monomers B1, from about 25 to about 40% of monomers B2, from about 10 to about 25% of monomers B3.

13. A process for preparing an aqueous self-crosslinking copolymer dispersion ABC as claimed in claim 1, which comprises in the first stage conducting a free-radically initiated copolymerization of the monomer mixture A, subsequently initiating a second polymerization step by adding a second monomer mixture B with or without further polymerization initiator, and adding to the resultant aqueous dispersion, directly or following at least partial neutralization, a compound C having at least two functional groups selected from hydrazine and hydrazine groups.

14. A binder for one-component coating materials, comprising a copolymer dispersion as claimed in claim 1.

15. A coating material which comprises a copolymer dispersion as claimed in claim 1.

16. The coating material as claimed in claim 15, which is transparent.

17. A coated substrate which is coated by a coating material as claimed in claim 15.

18. The coated substrate according to claim 17, wherein the substrate is wood, plastic, leather or paper.

19. An aqueous self-crosslinking copolymer dispersion ABC as claimed in claim 1, wherein the monomers of A3 and of B1 independently of one another are selected from the group consisting of styrene, vinyltoluene, and p-methylstyrene.

* * * * *